United States Patent [19]

Mykrantz

[11] Patent Number: 5,246,253
[45] Date of Patent: Sep. 21, 1993

[54] GARDEN PLANNING KIT

[76] Inventor: John R. Mykrantz, 2329 N. Ballas Rd., St. Louis, Mo. 63131

[21] Appl. No.: 777,901

[22] Filed: Oct. 17, 1991

[51] Int. Cl.$^5$ .............................................. B42D 15/00
[52] U.S. Cl. ...................................... 283/117; 40/594; 281/16; 281/29; 283/115; 33/16; 434/72; 434/430
[58] Field of Search ............ 40/594; 281/16, 29; 283/116, 117, 83, 115; 33/1 G; 434/72, 74, 79, 80, 93, 430

[56] References Cited

U.S. PATENT DOCUMENTS

| | | | |
|---|---|---|---|
| 2,155,924 | 4/1939 | Barrett et al. | 434/79 |
| 2,205,692 | 6/1940 | Johnson et al. | 35/51 |
| 2,305,567 | 12/1942 | Bole | 35/20 |
| 2,526,569 | 10/1950 | Lewis et al. | 35/16 |
| 2,958,948 | 11/1960 | Dunkelberger | 33/1 G |
| 3,565,462 | 2/1971 | Gottlieb | 281/3 |
| 3,785,065 | 1/1974 | Kamm | 35/16 |
| 4,137,650 | 2/1979 | Hayes | 281/16 X |
| 4,245,401 | 1/1981 | Riehle | 434/430 |
| 4,250,642 | 2/1981 | Riehle | 40/160 |
| 4,311,464 | 1/1982 | Messina | 434/74 |
| 4,652,239 | 3/1987 | Brimberg | 434/80 |
| 4,830,619 | 5/1989 | Marion | 434/382 |
| 4,902,229 | 2/1990 | Pedersen et al. | 434/80 |

FOREIGN PATENT DOCUMENTS 2822443 11/1979 Fed. Rep. of Germany ...... 434/430
2435234 5/1980 France .................................. 434/79

*Primary Examiner*—Paul A. Bell
*Attorney, Agent, or Firm*—Senniger, Powers, Leavitt & Roedel

[57] ABSTRACT

A garden planning kit including a book having a bottom panel, first spiral binder attached to a marginal edge of the bottom panel, second spiral binder attached to an opposite marginal edge of the bottom panel, and a plurality of transparent overlays. A first overlay is attached to the first spiral binder, and a second overlay and a third overlay are attached to the second spiral binder. All of the overlays may be moved on their respective spiral binders between a first position generally overlying the bottom panel and a second position away from the bottom panel. The first overlay depicts the plan view of the lower portion of preselected plants. The second overlay has blooms of said preselected plants at a first time of year depicted on it, and the third overlay depicts blooms of the plants at a second time of year different from the first time of year. The second overlay and the third overlay may be located in the first position over the first overlay one at a time for viewing the appearance of the garden to be planted at different times of the year.

16 Claims, 2 Drawing Sheets

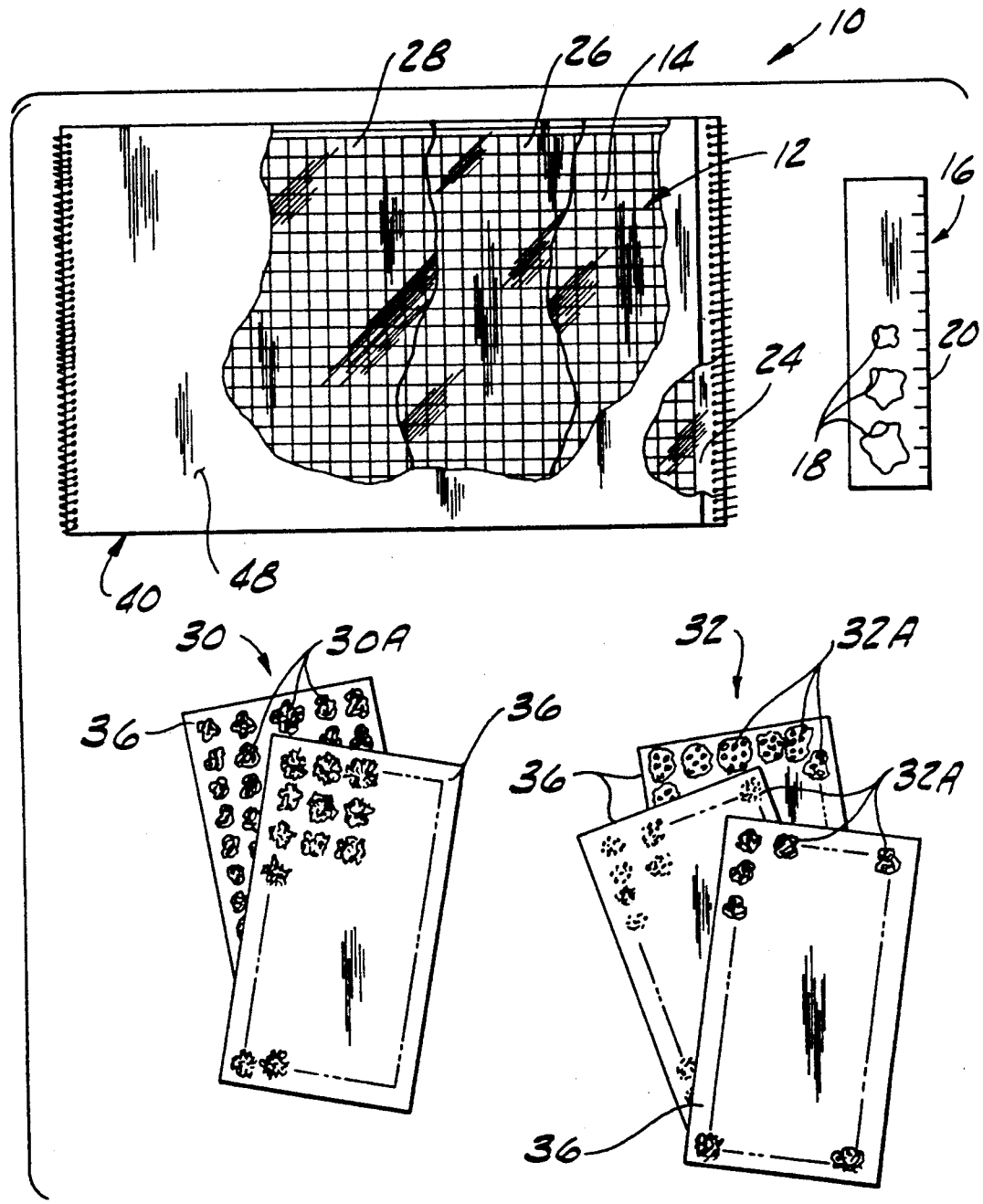

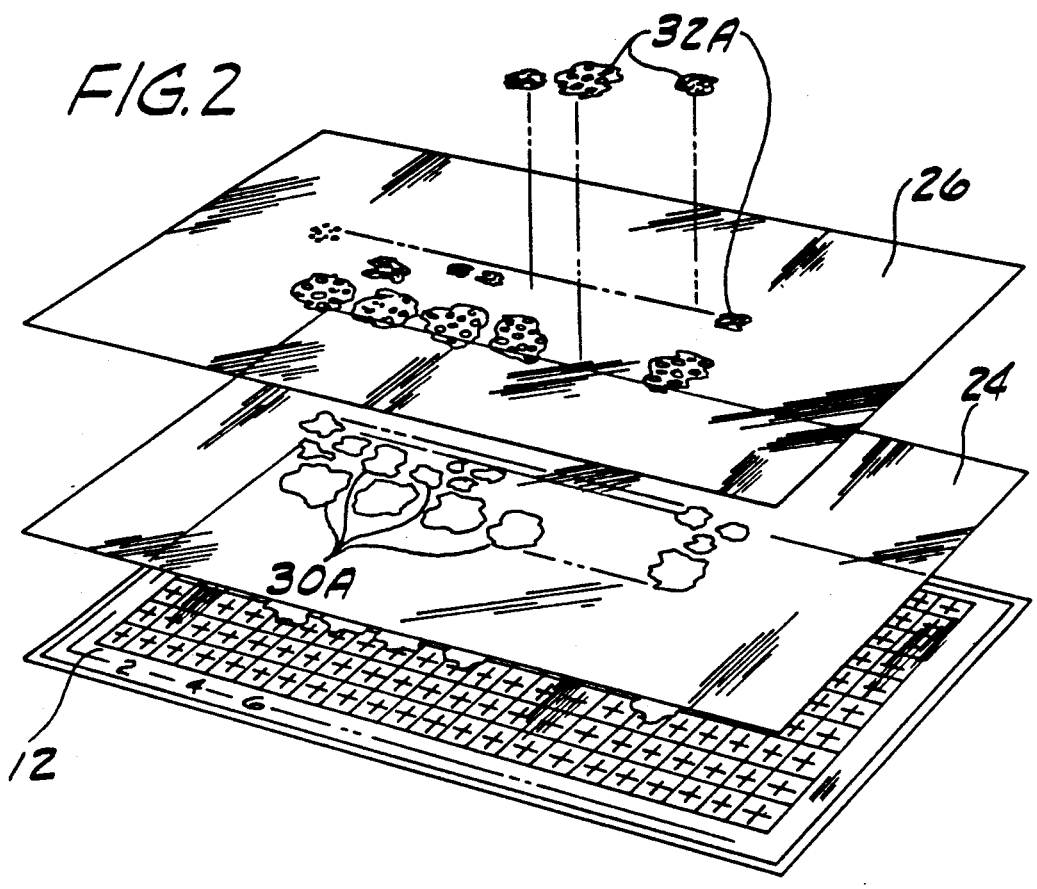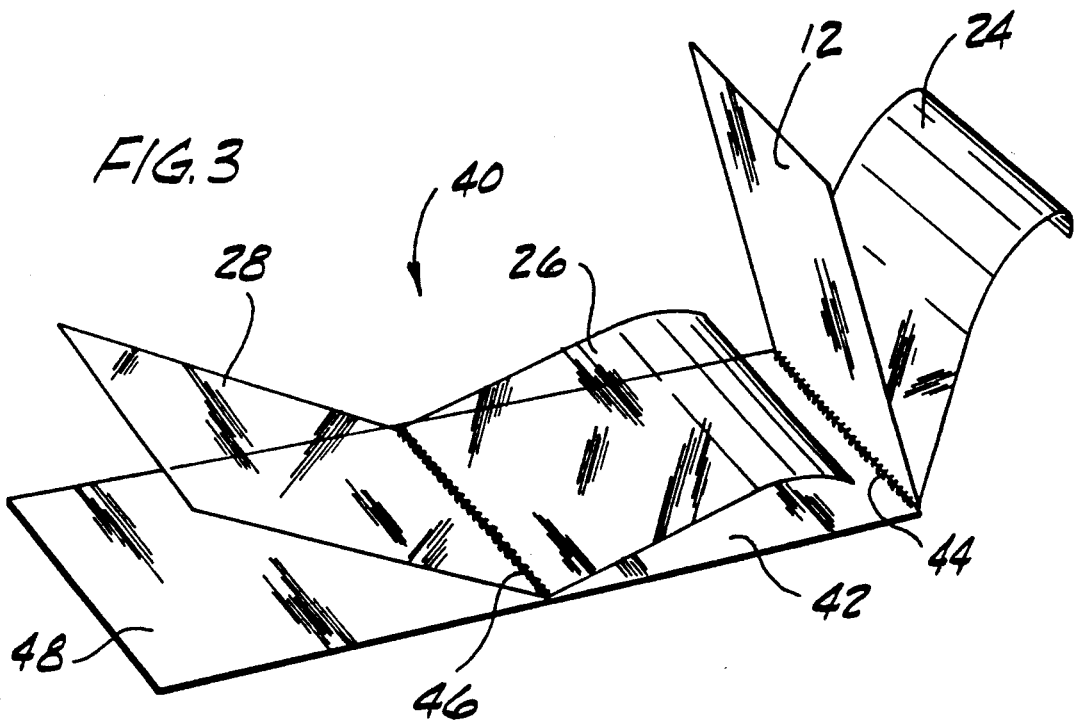

GARDEN PLANNING KIT

BACKGROUND OF THE INVENTION

This invention relates generally to garden planning aids, and more specifically to a garden planning kit.

It is desirable when planting a garden (e.g., a flower garden), to plan its appearance prior to engaging in the labor and expense of planting the garden. The selection of certain plants and their location in the garden depends to a significant degree upon the appearance of the plants during different times of the year. For instance, plants may be selected and located so that no part of the garden lacks blooming plants at any time during the growing season. Although numerous garden planners presently exist, there is a need for a garden planner in which the appearance of the garden with different plants or at during different times of the year may be easily constructed, repeatedly rearranged, and quickly reviewed.

SUMMARY OF THE INVENTION

Among the several objects and features of the present invention may be noted the provision of a garden planning kit in which the relative location of plants in the garden may be rapidly and accurately represented; the provision of such a kit which allows rapid interchange of components for viewing the appearance of the garden at different times of the year; the provision of such a kit which allows the representation of numerous kinds of plants and all times of the year to be depicted; and the provision of such a kit which is relatively inexpensive to manufacture and easy to use.

Further among the objects and features of the present invention may be noted the provision of a garden planning book in which the components are conveniently organized for quickly viewing and comparing the appearance of the garden at different times of the year.

Other objects and features of the present invention will be in part apparent and in part pointed out hereinafter.

BRIEF DESCRIPTION OF THE DRAWINGS

FIG. 1 is an elevation of the components of a garden planning kit of the present invention;

FIG. 2 is an exploded perspective of a garden planning kit; and

FIG. 3 is a perspective of a garden planning book of the present invention.

Corresponding reference characters indicate corresponding parts throughout the several views of the drawings.

DETAILED DESCRIPTION OF A PREFERRED EMBODIMENT

Referring now to the drawings, a garden planning kit of the present invention, indicated generally at 10, is shown to include a worksheet 12 which has been imprinted with horizontally and vertically extending lines to form a grid 14, and an elongate, rectangular template 16 having the openings 18 in it in the shape of the top plan appearance of predetermined sizes of plants for drawing outlines of these plants on the worksheet 12 as they would appear from above the garden. The sizes of the template openings 18 are on generally the same scale as the grid 14. In the preferred embodiment, three openings 18 of different sizes are provided. The openings 18 have an irregular perimeter which simulates the top plan appearance of the perimeter of plants. The three sizes provided allow accurate representation of nearly all common garden plants. Thus, preliminary dispositions of various types of plants in the garden may be accomplished on the worksheet 12 using the template 16. The worksheet 12 may be light brown in color to resemble the color of the soil in the garden. The location of plants relative each other in the garden to be planted may be represented accurately on the worksheet by using the grid 14 and a ruled longitudinal edge 20 of the template.

The garden planning kit 10 further includes a plurality of overlays (three are shown), indicated at 24, 26 and 28, respectively. A first set 30 and a second set 32 of self-adhesive decals are mounted on sheets of backing paper 36. Decals 30A of the first set 30 are representative of the green leafy portions of plants. However, it is to be understood that the decals 30A generally may represent the base, or lower portion of the plant, whether or not this portion is green or composed of leaves. The decals 30A generally have a color corresponding to the color of a particular type of plant represented, and are imprinted to depict leaves of different types of plants. In the preferred embodiment, decals 30A corresponding to the leafy portions of plants are provided in three different colors and sizes, and five leaf types (e.g., corresponding to fern-like leaves, etc.). The second set of decals 32A have the color and shape of the blooms of plants. The decals 32A come in many different colors so that the flowers of nearly all types of blooming plants may be depicted. The decals 32A may be transparent and the blooms imprinted on a small area of the decals. This allows the decals 32A to be handled easily despite the relatively small size of the blooms. However, the decals 32A may have blooms imprinted on an opaque, neutral colored background. The bloom decals 32A also come in different sizes and densities corresponding to the appearance of the blooms of various plant species. In the preferred embodiment, decals 32A of the second set come in seven colors, three sizes, five patterns (e.g., having a rose-like bloom, etc.), and two densities.

Referring now to FIG. 2 of the drawings, the outlines of plants selected to make up the garden are drawn onto the worksheet 12 using the template 16. The grid 14 and the ruled portion 20 of the template may be used to precisely locate the plants relative one another on the worksheet 12 so that a truly representative appearance of the garden may be achieved. A chart (not shown) is consulted to determine the decals 30A having the appropriate color and size to represent the base or leafy portions of the selected plants. The appropriate decals 30A are removed from their backing paper 36 and adhered to the first overlay 24 at the positions drawn on the underlying worksheet 12. The second overlay 26 is placed over the worksheet 12 and/or the first overlay 24 and the chart is again consulted to determine the decal 32A depicting appropriate color, size, type and density of the bloom for the plants which bloom during a particular time of year. The third overlay 28 (not shown in FIG. 2) may then be placed over the worksheet 12 and/or the first overlay 24, and decals 32A from the second set depicting the blooms of plants, which bloom during a different time of the year, adhered to the third overlay over the location of the appropriate plant. It is to be understood that this process may be repeated for more overlays so that the appearance of the garden during several times of the year may be represented.

Having prepared the overlays 24, 26, 28 as described, the appearance of the garden during different times of the year may be viewed. The first overlay 24 is placed on the worksheet 12 and another overlay (e.g., the second overlay 26) showing the blooms of the selected plants at a first time of year is positioned over the worksheet and the first overlay. If the bloom decals 32A are transparent except for the imprinted blooms, the portions of the foliage decals 30A not covered by the blooms are visible through the second overlay 26 and the bloom decals. However, if the bloom decals 32A have a solid, neutral colored background, only the foliage decals 30A of the plants not in bloom during the season represented on the second overlay 26 may be seen through the second overlay. The appearance of the garden at another time of year may then be quickly constructed by removing the second overlay 26 and positioning a different overlay (e.g., third overlay 28) over the worksheet 12 and the first overlay 24. It is to be understood that by modifying the decals to depict the entire top plan view of the plant, rather than only the leafy lower portion or the bloom, each overlay would depict the entire garden during a specific time of year. Thus, a person planning a garden could quickly and easily study the appearance of the garden during different times of the year by placing and replacing various overlays on the worksheet 12. The garden could also be viewed with different types of plants by preparing other overlays having these plants depicted thereon. The adhesive on the decals 30A, 32A allows them to be removed and repositioned or replaced on the overlays numerous times without failure to stick to the overlays.

In another embodiment of the present invention, a garden planning book 40, as shown in FIG. 3, includes a bottom panel 42, a first spiral binder 44 (broadly "first binding means") attached to the bottom panel along a first marginal edge, and a second spiral binder 46 (broadly, "second binding means") attached to the bottom panel along a second marginal edge opposite the first edge. The worksheet 12 and the first overlay 24 are attached along their right hand marginal edges (as viewed in FIG. 3) to the first spiral binder 44. The second and third overlays 26, 28 are attached along their left marginal edges to the second spiral binder 46. A book cover 48 of an opaque material may also be attached to the second spiral binder 46. The overlays 24, 26, 28 and the worksheet 12 may be moved on the first and second spiral binders 44, 46 between a first position generally overlying the bottom panel 42 to a second position removed from the bottom panel. As shown in FIG. 1, the book 40 may form a part of the kit 10. However, the worksheet 12 and overlays 24, 26, 28 may also be used without being bound in a book, as is illustrated in FIG. 2.

The operation for selecting plants and marking their relative location on the worksheet 12 in the book 40 is carried out in the same manner as described above, with the worksheet 12 in its first position overlying the bottom panel 42 of the book so that its grid 14 faces upwardly. The first overlay 24 is then swung on the first spiral binder 44 to its first position overlying the bottom panel 42 and the worksheet 12. The decals 30A of the leafy portions of the plants are then applied as described above. The decals 32A for the blooms may be applied to the second overlay 26 by swinging the second overlay to its first position in which it overlies the worksheet 12 and/or the first overlay 24. Similarly, decals 32A showing blooms of plants which bloom during a different time of year may be applied, to the third overlay 28 after it has been swung to its first position overlying the worksheet 12.

In order to view the garden as it would appear during the time of year depicted on the second overlay 26, the worksheet 12 and first overlay 24 are placed in their first position overlying the bottom panel 42 and the second overlay is pivoted on the second spiral binder 46 to its first position such that it overlies the worksheet and the first overlay. In this way the blooms depicted on the second overlay 26 are brought together with the leafy portions depicted on the first overlay 24 so that the complete appearance of the plants is represented. To view the garden as it would appear during a different time of year, the second overlay 26 is swung to its second position away from the bottom panel 42, worksheet 12 and first overlay 24. The worksheet 12 and first overlay 24 are then lifted up generally to the position illustrated in FIG. 3, and the second overlay 24 is swung back to its first position. The worksheet 12 and first overlay 24 are then replaced over the bottom panel 42, covering the second overlay 26. The third overlay 28 is then swung to its first position over the worksheet 12 and first overlay 26. In this way each of the overlays 26, 28 on the second binder 46 may be viewed over the worksheet 12 and first overlay 24 one at a time, although the overlays are bound in an organized fashion in the book 40. Clearly, the garden book 40 could have more transparent overlays mounted on the second spiral binder 46 which could be placed over the worksheet and first overlay as described above. Typically, at least three overlays would be attached to the second spiral binder 46 for use in representing the garden as it would appear in spring, summer and fall.

Thus, it may be seen that the several objects of the present invention are achieved by the garden planning kit 10. The worksheet 12 and template 16 allow the relative location of the plants to be accurately and quickly plotted. The provision of sets of decals 30A, 32A representing the leafy portions of various types of plants and the blooms of those plants allows different transparent overlays to be prepared for different times of the year. The appearance of the garden during different times of the year may thus be rapidly changed by merely placing different overlays having the decals 32A depicting plant blooms over the first overlay 24 having the decals 30A depicting the leafy portions of the plants. Moreover, the overlays 24, 26, 28 and worksheet 12 may be neatly held in the garden planning book 40 of the present invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A garden planning kit comprising a worksheet having a grid thereon, at least one template having openings therein for drawing the outlines of predetermined sizes of plants on the worksheet using the grid to facilitate placement of the plant outlines on the worksheet in relative locations representative of the locations of plants in a garden to be planted, a plurality of overlays of transparent material, sets of self-adhesive decals and backing paper for mounting the decals prior to use, said sets of decals including a first set in which the decals depict the lower portion of predetermined types of plants, and a second set in which the decals depict plant blooms of said predetermined types of plants whereby said decals from said first set may be selectively removed from the backing paper and adhered to a first of the overlays overlying the worksheet according to the location of the plants as outlined on the worksheet grid, and said decals from said second set may be selectively removed from the backing paper and adhered to other of the overlays according to the location of the plants as outlined on the worksheet grid, all of the decals of said second set of decals on each of said other overlays depicting the flowers of the selected plants which are in bloom during a particular time of year, such that the appearance of the garden at different times of the year may be viewed by placing the different overlays on the worksheet and said first overlay.

2. The garden planning kit as set forth in claim 1 wherein the template comprises a sheet of material having openings therein having shapes generally corresponding to the top plan outline of predetermined sizes of plants.

3. The garden planning kit as set forth in claim 2 wherein the template is elongate and generally rectangular in shape, and wherein the template is ruled generally along a longitudinal edge thereof.

4. The garden planning kit as set forth in claim 1 further comprising a plurality of sheets of backing paper on which the decals are mounted, each sheet having a plurality of decals mounted thereon.

5. The garden planning kit as set forth in claim 4 wherein at least some of the decals are of different colors.

6. The garden planning kit as set forth in claim 5 wherein at least some of the decals have different sizes.

7. The garden planning kit as set forth in claim 6 wherein the worksheet is generally the color of soil.

8. The garden planning kit as set forth in claim 1 further comprising first binding means having said first overlay attached thereto along a marginal edge of said first overlay for movement of said first overlay on said first binding means between a first position generally overlying the worksheet and a second position away from the worksheet, and second binding means having the remainder of the overlays attached to said second binding means along a marginal edge of the overlays for movement of the overlays on said second binding means between a first position generally overlying the worksheet and a second position away from the worksheet, said second binding means being disposed on the opposite side of the worksheet from said first binding means whereby overlays attached to said second binding means and depicting flowers of the plants which are in bloom at different times of the year may be alternatively placed over the worksheet for viewing the appearance of the garden to be planted at different times of the year.

9. The garden planning kit as set forth in claim 8 wherein the worksheet is attached along a marginal edge thereof to said first binding means.

10. The garden planning kit as set forth in claim 9 further comprising a bottom panel, said first binding means being attached to the bottom panel along a first marginal edge of the bottom panel and said second binding means being attached to the bottom panel along a second marginal edge of the bottom panel opposite the first marginal edge.

11. A garden planning book comprising a bottom panel, first binding means attached to a marginal edge of the bottom panel, second binding means attached to an opposite marginal edge of the bottom panel, a plurality of transparent overlays including a first overlay, a second overlay and a third overlay, the first overlay being attached to said first binding means along a marginal edge of the overlay for movement of the overlay on said first binding means, said second overlay and said third overlay being attached to said second binding means along marginal edges thereof for movement between a first position generally overlying the bottom panel and a second position away from the bottom panel, said first overlay being adapted to depict the plan view of the lower portion of predetermined types of plants thereon, said second overlay being adapted to depict the top plan view of the flowers of said plants which are in bloom at a first time of year thereon, and said third overlay being adapted to depict the top plan view of flowers of said plants which are in bloom at a second time of year different from said first time of year, said second overlay and said third overlay being adapted to be located in said first position over the first overlay one at a time for viewing the appearance of the garden to be planted at different times of the year, said garden planning book further comprising a worksheet attached along a marginal edge thereof to said first binding means, the worksheet having a grid to facilitate placement of the plants on the worksheet in relative locations representative of the locations of plants in a garden to be planted and sets of self-adhesive decals and backing paper for mounting the decals prior to use, said sets of decals including a first set in which the decals depict the lower portion of a predetermined types of plants, and a second set in which the decals depict plant blooms of said predetermined types of plants whereby said decals from said first set may be selectively removed from the backing paper and adhered to said first overlay according to the location of the plants represented on the worksheet grid, and said decals from said second set may be selectively removed from the backing paper and adhered to said second and third overlays according to the location of the plants as outlined on the worksheet.

12. A garden planning book as set forth in claim 4 further comprising at least one template having openings therein having the shapes of the top plan outlines of predetermined sizes of plants for drawing the outlines of said plants on the worksheet.

13. The garden planning book as set forth in claim 12 wherein the template is elongate and generally rectangular in shape, and wherein the template is ruled generally along a longitudinal edge thereof.

14. A garden planning book comprising a bottom panel, first binding means attached to a marginal edge of the bottom panel, second binding means attached to an opposite marginal edge of the bottom panel, an opaque worksheet attached along a marginal edge thereof to said first binding means for movement between a first position generally overlying the bottom panel and a second position away from the bottom panel, the worksheet having a grid thereon to facilitate placement of the plants on the worksheet in relative locations representative of the locations of plants in a garden to be planted, a plurality of transparent overlays attached to said second binding means along a marginal edge of the overlays for movement of the overlays on said second binding means between a first position generally overlying the bottom panel and a second position away from the bottom panel, a plurality of sets of self-adhesive decals and backing paper for mounting the decals prior to use, said sets of decals depicting the top plan appearance of predetermined types of plants as seen during different times of the year whereby some of some decals may be selectively removed from the backing paper and adhered to a first of the overlays according to the location of the plants as outlined on the worksheet, thereby to depict the top plan appearance of predetermined types of plants during a first time of year, such as spring, and others of said decals may be selectively removed from the backing paper and adhered to a second of the overlays according to the location of the plants as outline on the worksheet thereby to depict the top plan appearance of different plants of the same plants during a second time of year, such as summer, the overlays being adapted to be located over the worksheet in their respective first positions for viewing the appearance of the garden to be planted with different plants or at different times of the year.

15. A garden planning book as set forth in claim 14 further comprising at least one template having openings therein having shapes generally corresponding to the plan outlines of predetermined sizes of plants for drawing the outlines of predetermined types of plants on the worksheet.

16. The garden planning book as set forth in claim 15 wherein the template is elongate and generally rectangular in shape, and wherein the template is ruled generally along a longitudinal edge thereof.

* * * * *